(12) United States Patent
Ellis et al.

(10) Patent No.: US 7,246,971 B1
(45) Date of Patent: Jul. 24, 2007

(54) STABILISATION OF SUBMARINE ELONGATE STRUCTURES

(75) Inventors: Barry Errol Ellis, Bicton (AU); Antonino John Fogliani, Coolbinia (AU)

(73) Assignee: J P Kenny Pty Limited, Perth, Western Australia (AU)

( * ) Notice: Subject to any disclaimer, the term of this patent is extended or adjusted under 35 U.S.C. 154(b) by 0 days.

(21) Appl. No.: 10/018,125

(22) PCT Filed: Jun. 26, 2000

(86) PCT No.: PCT/AU00/00722

§ 371 (c)(1),
(2), (4) Date: Mar. 3, 2003

(87) PCT Pub. No.: WO01/01028

PCT Pub. Date: Jan. 4, 2001

(30) Foreign Application Priority Data

Jun. 25, 1999 (AU) .................................... PQ1196

(51) Int. Cl.
*F16L 1/16* (2006.01)

(52) U.S. Cl. .................. 405/168.1; 405/172; 405/157; 405/158; 138/106; 248/49

(58) Field of Classification Search ............. 405/154.1, 405/156, 158, 168.1, 168.2, 157, 172, 168.4; 138/105, 106, 107; 248/49, 74.1, 70, 505, 248/507, 508; 254/134.35 C, 134.3 R; 166/343, 166/367

See application file for complete search history.

(56) References Cited

U.S. PATENT DOCUMENTS

| 3,237,438 | A | * | 3/1966 | Tesson | 405/168.3 |
| 3,650,114 | A | * | 3/1972 | Neal | 405/168.4 |
| 3,848,639 | A | * | 11/1974 | Chen | 138/106 |
| 4,225,270 | A | * | 9/1980 | Dareing | 166/346 |
| 4,242,010 | A | | 12/1980 | Gjerde et al. | |
| 4,338,045 | A | | 7/1982 | Cour | |
| 4,443,129 | A | * | 4/1984 | de Sivry et al. | 405/170 |
| 4,688,966 | A | * | 8/1987 | Esparza | 166/367 |
| 4,704,049 | A | * | 11/1987 | Vilain | 405/158 |

(Continued)

FOREIGN PATENT DOCUMENTS

AU 59 533 3/1975

(Continued)

*Primary Examiner*—Frederick L. Lagman
(74) *Attorney, Agent, or Firm*—Merchant & Gould P.C.

(57) ABSTRACT

A stabilization system (10) for a section of submarine pipeline (11) comprising an end restraint (15) at each end of the section of pipeline and intermediate restraints (20) between the two end restraints (15) for limiting lateral movement of the pipeline (11) at the location of the restraints (15, 20). Each end restraint (15) is adapted to be secured to the pipeline (11) to transfer axial tension generated by lateral movement of the pipeline (11) to the seabed or ground on which the end restraint is installed. Each restraint (15, 20) comprises a pair of restraint faces (21) spaced apart to define a gap (23) through which the pipeline (11) can extend. Each restraint face (21) is configured to control curvature of the pipeline (11) during lateral movement thereof. A restraint device and a method of stabilizing a submarine pipeline is also disclosed and claimed.

19 Claims, 5 Drawing Sheets

U.S. PATENT DOCUMENTS

| | | | |
|---|---|---|---|
| 5,197,716 A * | 3/1993 | Zibilich et al. | 254/134.3 SC |
| 5,263,796 A * | 11/1993 | de Waal | 405/172 |
| 5,290,127 A * | 3/1994 | Foster et al. | 405/172 |
| 5,518,340 A * | 5/1996 | Hall et al. | 405/158 |
| 5,603,588 A | 2/1997 | Herbert | |
| 5,730,552 A * | 3/1998 | Johannesson et al. | 405/172 |
| 5,785,457 A * | 7/1998 | Thompson et al. | 405/172 |
| 6,004,071 A * | 12/1999 | Broeder et al. | 405/168.1 |
| 6,132,141 A * | 10/2000 | Kirk | 405/172 |
| 6,332,595 B1 * | 12/2001 | Klucznik | 248/87 |

FOREIGN PATENT DOCUMENTS

| | | | | |
|---|---|---|---|---|
| DE | 42 22 789 | | 5/1993 | |
| GB | 2036918 | * | 7/1980 | 405/172 |
| JP | 53136696 | * | 11/1978 | 405/160 |
| JP | 02046387 | * | 2/1990 | 405/172 |
| WO | WO 89/11055 | | 11/1989 | |
| WO | WO 92/20947 | | 11/1992 | |
| WO | WO 93/01438 | | 1/1993 | |
| WO | WO 97/20160 | | 6/1997 | |

* cited by examiner

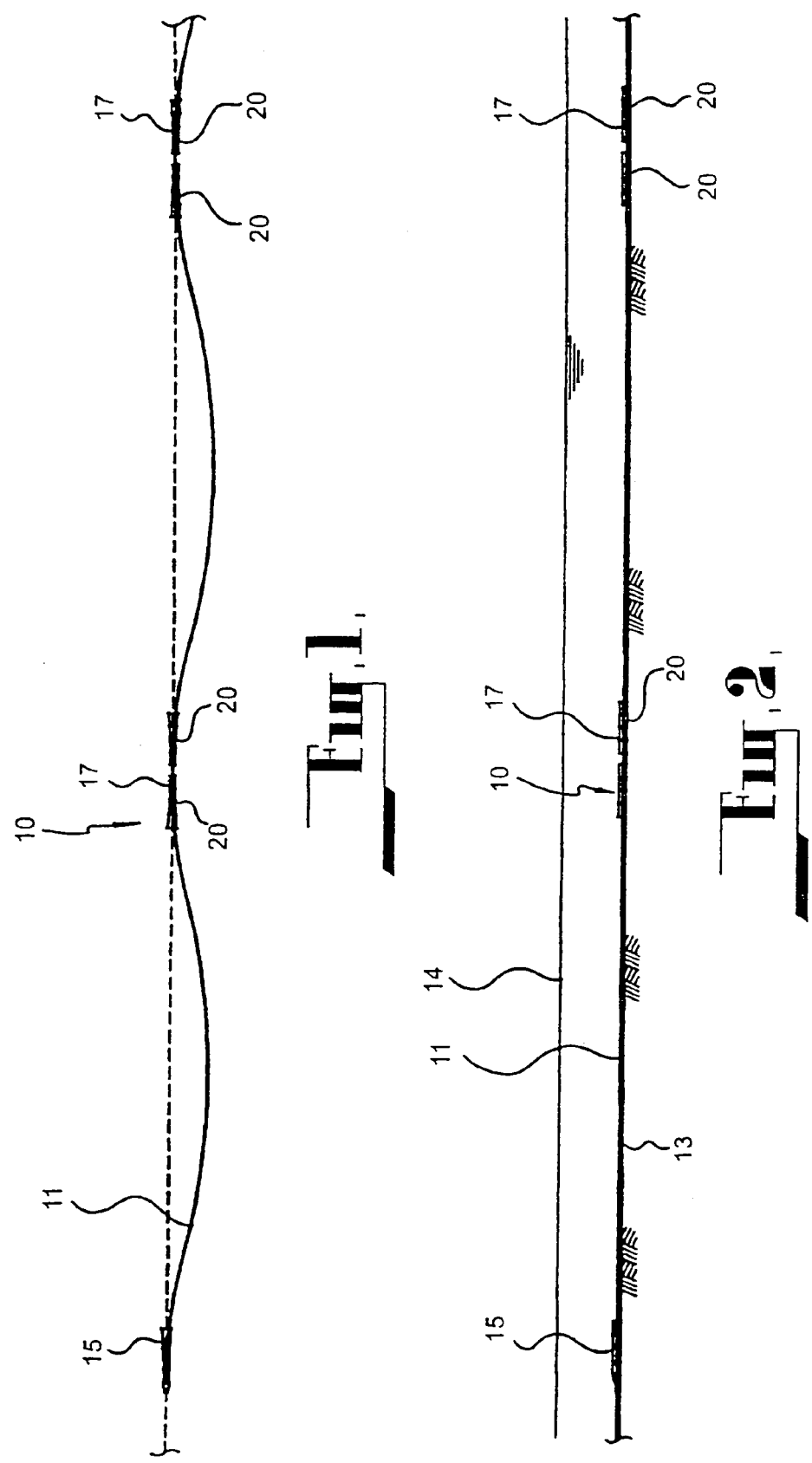

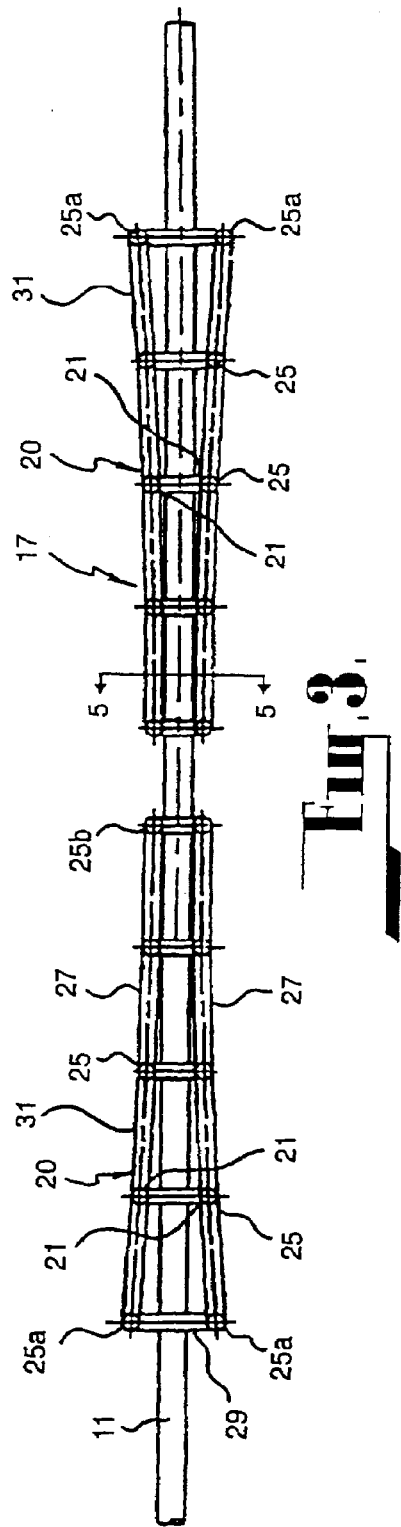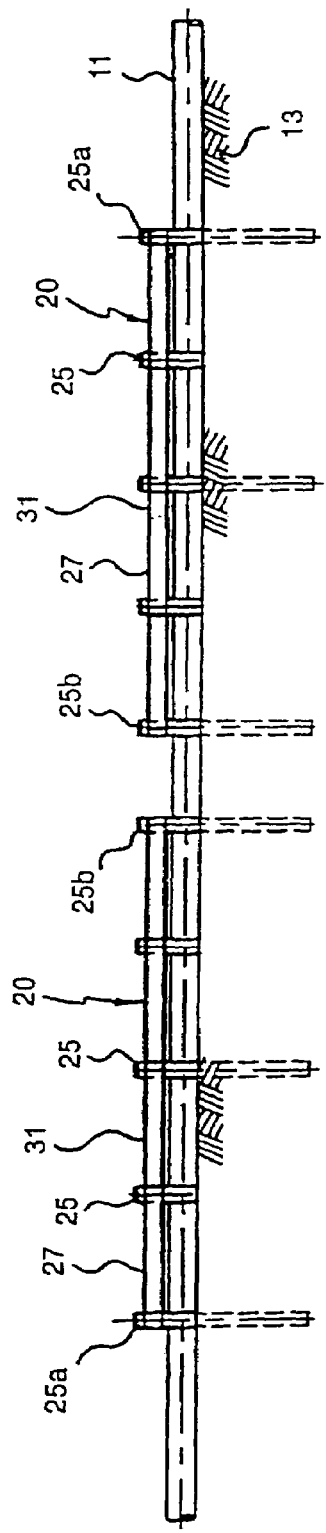

US 7,246,971 B1

STABILISATION OF SUBMARINE ELONGATE STRUCTURES

FIELD OF THE INVENTION

This invention relates to stabilisation of submarine elongate structures, such as pipelines including single and multiple pipelines (bundled and unbundled), umbilicals, cables, and other service conduits.

BACKGROUND ART

Submarine elongate structures, and in particular submarine pipelines, can become unstable through exposure to environmental influences, particularly hydrodynamic loads arising from underwater currents and wave action. These hydrodynamic loads typically increase in regions of shallow water. The combination of extreme environmental loads and shallow water are present in Australian waters, typically on the North West Shelf off the West Australian coast.

Various systems are currently utilised for submarine pipeline stabilisation, including weight coatings on pipelines, coverings on pipelines, installation of pipelines in trenches in the seabed, and securing pipelines to the seabed by way of mechanical anchors. Various deficiencies and problems can be associated with each of these stabilisation systems. For example, weight coating requirements for pipelines can be very high or impracticable. Trenching of pipelines is required to be deep in the seabed. Coverings over the pipeline need to be thick and of adequate weight, and in some cases the covering material may itself be unstable. Mechanical anchors of high capacity are required at close intervals to secure the pipelines to the seabed.

While the abovementioned systems can be utilised in many situations, there are locations where the cost involved can be very high or indeed prohibitive, and the installation procedure can be time-consuming.

It is against this background, and the deficiencies and problems associated therewith, that the present invention has been developed.

DISCLOSURE OF THE INVENTION

The present invention provides a stabilisation system for a section of a submarine elongate structure comprising an end restraint at each end of the section of the elongate structure, each end restraint being adapted to be secured to the elongate structure to transfer axial tension generated by lateral movement of the elongate structure to the seabed or ground on which the end restraint is installed, each restraint comprising a pair of restraint faces spaced apart to define a gap through which the elongate structure can extend, each face being configured to control curvature of the elongate structure during lateral movement thereof.

At least one intermediate restraint may be provided between the two end restraints for limiting lateral movement of the structure at the location of the intermediate restraint.

The restraint locations provided by the end restraints and any intermediate restraint therebetween are spaced sufficiently to allow the elongate structure to move laterally and develop axial tension until an equilibrium position is achieved. The restraint locations are selected so as to maintain axial tensions (and associated axial stresses) within allowable limits and to ensure that the extent of lateral movement of the elongate structure between the restraint locations is within an allowable range.

The configuration of the two restraint faces of each restraint allows the elongate structure to curve to one side or the other at the restraint location (depending on the direction of lateral movement) while limiting the maximum extent of curvature.

Preferably, each restraint face is curved.

Each restraint face can be either a continuous face, or a discontinuous face in the sense that it comprises a plurality of restraint zones disposed in the required configuration. Each restraint zone may be defined by a restraint column embedded in the seabed or ground. The columns may be connected one to the other to provide an integral restraint structure.

The present invention further provides a stabilisation system for a section of a submarine elongate structure comprising an end restraint at each end of the section of the elongate structure and at least one intermediate restraint between the two end restraints for limiting lateral movement of the structure at the location of the restraint, each end restraint being adapted to be secured to the elongate structure to transfer axial tension generated by lateral movement of the elongate structure to the seabed or ground on which the end restraint is installed, each restraint comprising a pair of restraint faces spaced apart to define a gap through which the elongate structure can extend, each face being configured to control curvature of the elongate structure during lateral movement thereof.

The invention also provides a restraint device comprising a pair of restraint faces spaced apart to define a gap therebetween to receive a section of an elongate structure, each restraint face being configured to control curvature of the elongate structure during lateral deflection thereof.

Each restraint face of the restraint device may be of a construction as set forth above in relation to the stabilisation system according to the invention.

The or each intermediate restraint used in the stabilisation system according to the invention may comprise a restraint device as defined above.

Each end restraint used in the stabilisation system according to the invention may comprise a restraint device as defined above together with a collar structure adapted to be secured to the elongate structure and bear on the restraint device to transfer axial loading thereto.

The invention also provides a method of stabilising a submarine elongate structure comprising the steps of: anchoring two axially spaced apart sections of the elongate structure to the seabed or ground using end restraints, each restraint presenting two restraint faces on opposed sides of the elongate structure, each restraint face being of a configuration for limiting curvature of the elongate structure.

The method may further include the step of installing one or more intermediate restraints between the two end restraints.

The invention still further provides a method of stabilising a submarine elongate structure comprising the steps of: anchoring two axially spaced apart sections of the elongate structure to the seabed or ground using end restraints, and installing one or more intermediate restraints between the two end restraints; each restraint presenting two restraint faces on opposed sides of the elongate structure, each restraint face being of a configuration for limiting curvature of the elongate structure.

BRIEF DESCRIPTION OF THE DRAWINGS

The invention will be better understood by reference to the following description of one specific embodiment thereof as shown in the accompanying drawings in which:

FIG. 1 is a schematic plan view of a section of a pipeline fitted with a stabilisation system according the embodiment;

FIG. 2 is an elevational view of FIG. 1;

FIG. 3 is a fragmentary plan view of the pipeline, showing a pair of intermediate restraint devices;

FIG. 4 is a side elevational view of FIG. 3;

BEST MODE(S) FOR CARRYING OUT THE INVENTION

Figure 5:
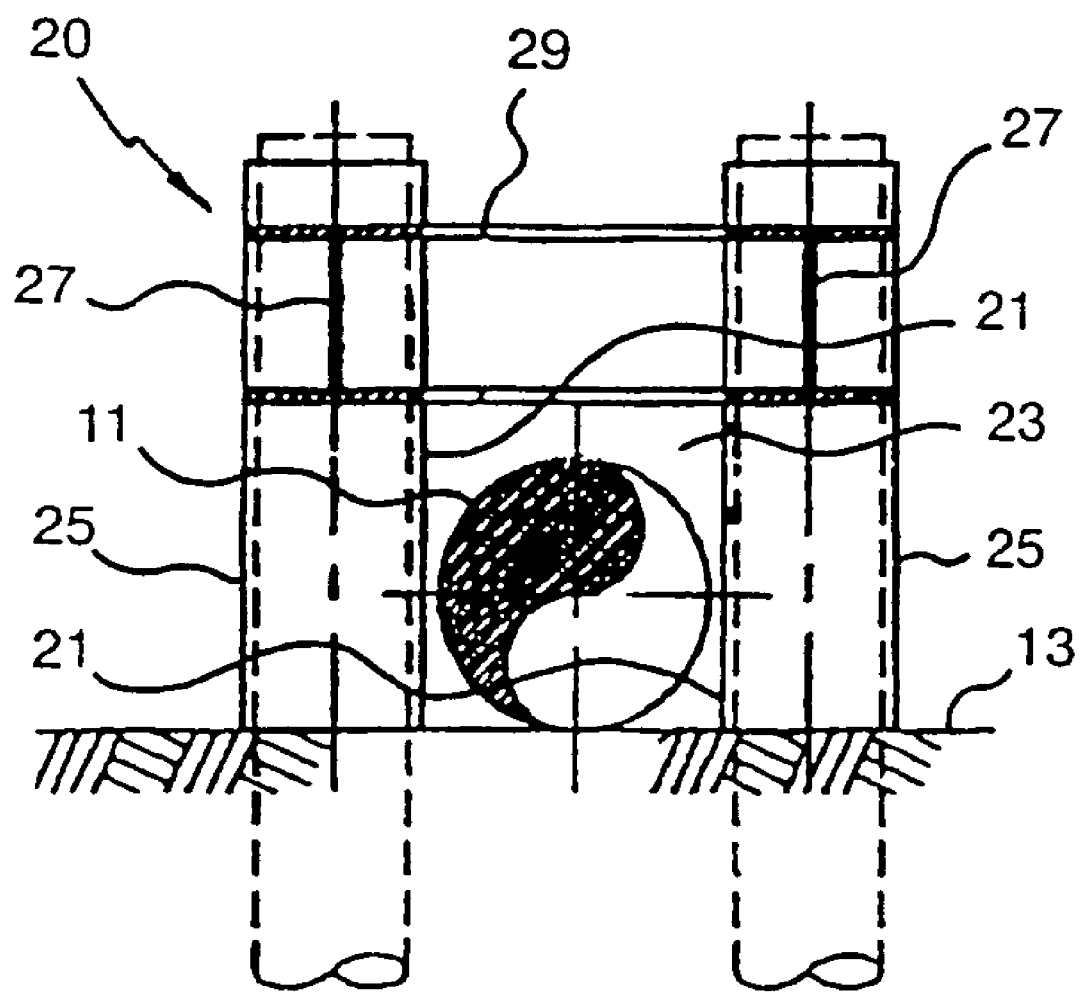
FIG. 5 is a sectional view on line 5-5 of FIG. 3.
Figure 6:
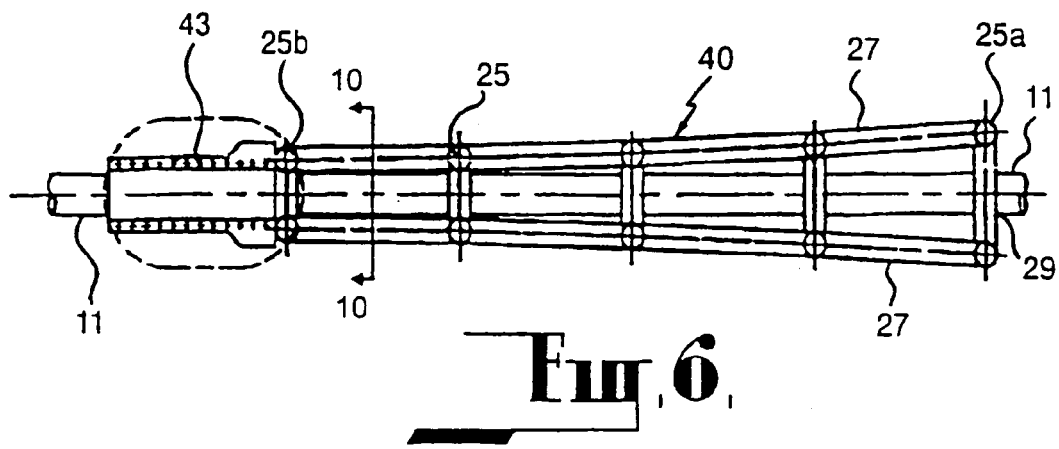
FIG. 6 is a fragmentary plan view of the pipeline showing an end restraint.
Figure 7:
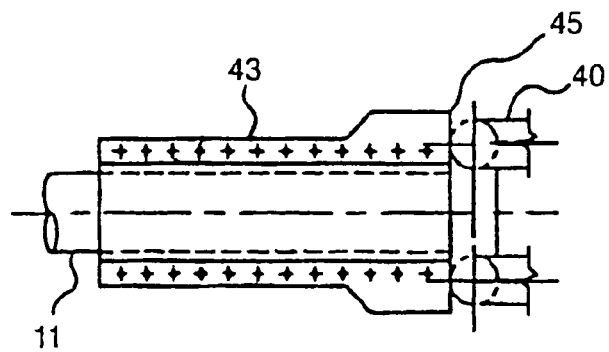
FIG. 7 is a fragmentary plan view of part of the end restraint.
Figure 8:
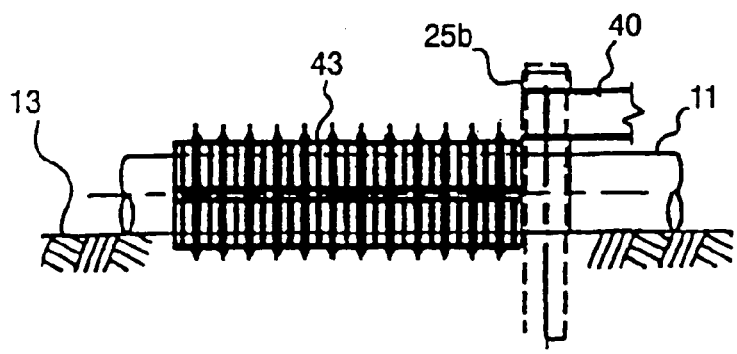
FIG. 8 is a side view of FIG. 7.
Figure 9:
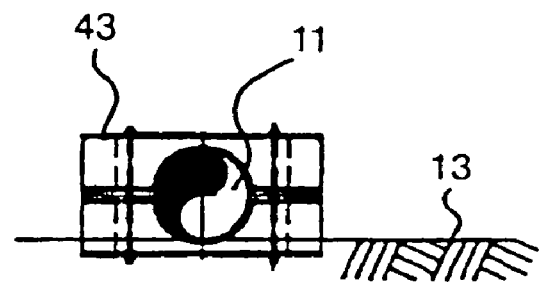
FIG. 9 is an end view of the collar structure.
Figure 10:
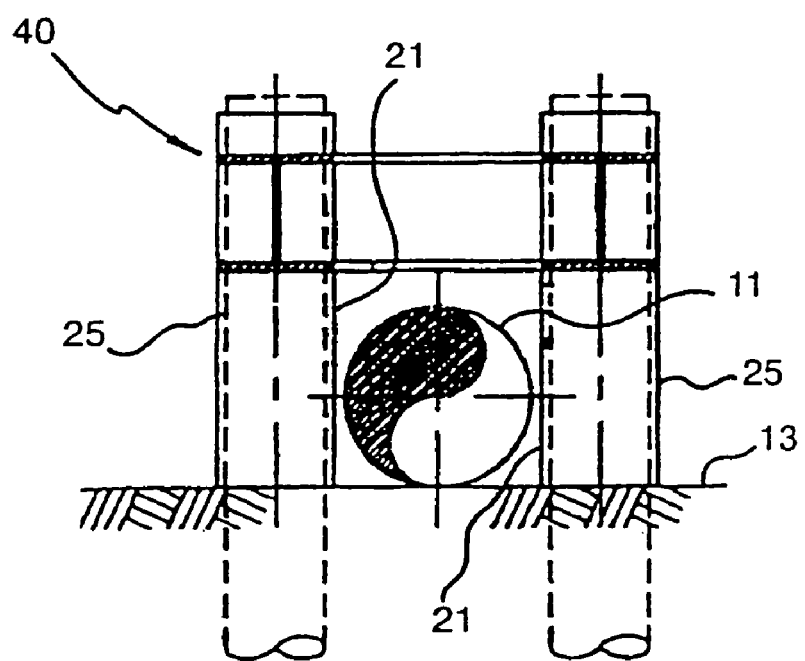
FIG. 10 is a sectional view on line 10-10 of FIG. 6.

The embodiment shown in the drawings is directed to a stabilisation system 10 for stabilising a submarine pipeline 11 supported on a seabed 13 below water level 14.

The stabilisation system 10 includes two end restraints 15, one at each end of the section of the pipeline requiring stabilisation (only one of the restraints 15 being shown in the drawings). The pipeline stabilisation system 10 further includes a plurality of intermediate restraints 17 positioned at intervals along the length of the pipeline 11. The intermediate restraints comprise restraint devices 20 are positioned in pairs, as will be explained in detail later.

The end restraints 15 are secured to the pipeline section to transfer axial tension, generated by lateral movement of the pipeline, to the seabed or the ground on which the end restraints 15 are installed. Typically, each end restraint 15 would be positioned on the seabed 13 as shown in the drawings, but it may be positioned on the ground (shoreline) at a location where the pipeline enters or exits the water, As mentioned above, the intermediate restraint devices 20 are positioned in pairs, as best seen in FIGS. 3 and 4 of the drawings. The intermediate restraint devices 20 are positioned in pairs in order to facilitate installation. In the event that larger capacity installation equipment is used, a combined single unit may be used.

Each restraint device 20 comprises two opposed restraint faces 21 in spaced apart relationship to define a gap 23 therebetween through which the pipeline 11 extends. In this embodiment, each restraint face 21 is defined by a plurality of spaced apart columns 25, at least some of which are embedded in the seabed 13, as best seen in FIGS. 4 and 5. With this arrangement, each column 25 defines a restraint zone for restraining lateral movement of the pipeline.

The columns 25 are arranged in a curved formation so that the restraint face 21 that they define is of a curved configuration, as best seen in FIG. 3 of the drawings. The columns 25a at one end are furthest apart and the columns 25b at the other end are closest together, so that the gap 23 between the faces 21 progressively increases from one end to the other. The upper ends of the columns 25 are interconnected by longitudinal elements 27 and transverse elements 29. With this arrangement, the combination of the columns 25 together with the longitudinal elements 27 and transverse elements 29 form a unitary structure 31.

The two restraint devices 20 in each pair are positioned such that the end columns 25b are adjacent each other and the corresponding restraint faces 21 in alignment. With this arrangement, the two restraint devices 20 co-operate to control the extent to which the pipeline 11 can curve to one lateral side or the other at the location at which the two restraint devices 20 are installed. This control is achieved by the curvature of the restraint faces 21.

Each of the end restraints 15 comprise a restraint device 40 of similar construction to the restraint devices 20, and a restraining collar structure 43 secured to the pipeline 11. As restraint device 40 is of similar construction to restraint device 20, similar reference numerals are used to identify like parts. The collar structure 43 presents an abutting face 45 which bears against the columns 25b which are positioned closest together. Co-operation between each collar structure 43 and the restraint device 40 against which it bears serves to transfer axial tension generated by lateral movement of the pipeline 11 to the seabed 13 (or ground) in which the restraint device 40 is anchored. The curved restraint faces 21 control the extent to which the pipeline 11 can curve at the end restraint 15.

The collar structure 43 is of split construction comprising two parts which can be bolted or otherwise secured together around the pipeline to clampingly engage the pipeline. Such an arrangement is particularly suitable in cases when the stabilisation system 10 is fitted to an existing pipeline. In cases when the stabilisation system is fitted during installation of a new pipeline, the collar structure may be welded or otherwise secured to the pipeline.

The end restraints 15 are positioned at the ends of the pipeline section to be stabilised and the intermediate restraint devices 20 are positioned in pairs at appropriate intervals between the end restraints 15. Typically, the spacing between each end restraint 15 and the adjacent intermediate restraint 17, and the spacing between intermediate restraints 17, could be in the order of one kilometre or more. Associated lateral movements of the pipeline 11 between the restraint locations can be in the order of 20 meters or more. This compares with conventional restraint systems where restraint locations have spacings in the order of 20 meters and have negligible movement of the restrained pipeline between the restrained locations.

The fact that the restraint system according to the embodiment can have restraint locations at significantly greater spacings than conventional arrangements allows installation in considerably less time and at a considerably lower cost.

The feature whereby the restraint faces 21 in the end restraints 15 and in the intermediate restraints 17 control the extent to which the pipeline 11 can curve as it undergoes lateral movement, permits the use of restraint locations at significantly increased spacings in comparison to conventional arrangements.

In operation, the curved restraint faces 21 support the pipeline 11 as it undergoes lateral movement and control the extent to which the pipeline can bend, thereby restraining lateral movement of the pipeline and stabilising the pipeline by ensuring that the lateral movement and the associated pipeline stresses are within allowable limits.

From the foregoing, it is evident that the present invention provides a simple yet highly effective arrangement for stabilisation of submarine pipelines and other like structures It should be appreciated that the scope of the invention is not limited to the scope of the embodiment described. There are, for example, instances where intermediate restraints would not be required between the end restraints. One such instance may be where a pipeline is relatively short (for example up to 1 km long). In such a case, the two end restraints are likely to work effectively without the need for any intermediate restraint.

Throughout the specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A stabilization system for a section of a submarine elongate structure, comprising an end restraint at each end of the section of the elongate structure, each end restraint being adapted to be secured to the elongate structure to transfer axial tension generated by a lateral movement of the elongate structure to the seabed or ground on which the end restraint is installed, each restraint comprising a pair of restraint faces spaced apart to receive a length of the elongate structure, each face being configured to operate along and control curvature of the length of the elongate structure during lateral movement thereof, each face providing for lateral movement of the length of the elongate structure within the restraint.

2. A stabilization system according to claim 1 wherein at least one intermediate restraint is provided between the two end restraints for limiting lateral movement of the structure at the location of the intermediate restraint.

3. A stabilization system according to claim 1 wherein each restraint face is curved in a direction along the length of the elongate structure when received therebetween.

4. A stabilization system according to claim 1 wherein each restraint face comprises a discontinuous face defined by a plurality of restraint zones disposed in the required configuration.

5. A stabilization system according to claim 4 wherein each restraint zone is defined by a restraint column adapted to be embedded in the seabed or ground.

6. A stabilization system according to claim 5 wherein the columns are connected one to the other to provide an integral restraint structure.

7. A stabilization system for a section of a submarine elongate structure comprising an end restraint at each end of the section of the elongate structure and at least one intermediate restraint between the two end restraints, each end restraint being adapted to be secured to the elongate structure to transfer axial tension generated by lateral movement of the elongate structure to the seabed or ground on which the end restraint is installed, each restraint comprising a pair of restraint faces spaced apart to receive a length of the elongate structure, each face being configured to operate along and control curvature of the length of the elongate structure during lateral movement thereof, each face providing for lateral movement of the length of the elongate structure within the restraint.

8. A stabilization system according to claim 7 wherein each end restraint further comprises a collar structure adapted to be secured to the elongate structure and bear on the end restraint to transfer axial loading thereto.

9. A restraint device comprising a pair of restraint faces laterally spaced apart to receive a length of a submarine elongate structure therebetween, each restraint face being configured to operate along and control curvature of the length of the elongate structure during lateral deflection thereof, each restraint face providing for lateral movement of the length of the elongate structure within the restraint device, each restraint face comprising a discontinuous face defined by a plurality of restraint zones.

10. A restraint device according to claim 9 wherein each restraint face is curved in a direction along the length of the elongate structure when received therebetween.

11. A restraint device according to claim 9 wherein each restraint device comprises a discontinuous face defined by a plurality of restraint zones disposed in the required configuration.

12. A restraint device according to claim 11 wherein each restraint zone is defined by a restraint column adapted to be embedded in the seabed or ground.

13. A restraint device according to claim 12 wherein the columns are connected one to the other to provide an integral restraint structure.

14. A method of stabilizing a submarine elongate structure comprising the steps of: anchoring two axially spaced apart sections of the elongate structure to the seabed or ground using end restraints, and installing one or more intermediate restraints between the two end restraints; each restraint presenting two restraint faces on opposed sides of the elongate structure, each restraint face being of a configuration for receiving a length of the elongate structure and limiting curvature of the elongate structure by operating along the length of the elongate structure, each restraint face providing for lateral movement of the elongate structure within the restraint.

15. A stabilization system for a section of a submarine elongate structure, the stabilization system comprising: a restraint for limiting the lateral movement of the elongate structure; the restraint comprising two restraint means laterally spaced apart so as to be arranged to allow the elongate structure to extend therebetween; each of the restraint means being configured to allow lateral movement of the elongate structure proximate the restraint means, during which lateral movement the restraint means controls curvature of the elongate structure by impressing a characteristic curvature of the restraint means therealong; each restraint means comprising a plurality of discrete restraint zones disposed so as to be spaced along the elongate structure.

16. A stabilization system as claimed in claim 15 wherein the curvature impressed by each of the restraint means is substantially the same for a given lateral movement of the elongate structure towards that restraint.

17. A stabilization system as claimed in claim 15 wherein each of the restraint means comprises a curved restraint face, the restraint face being curved in a direction along the elongate structure, when received between the restraint means.

18. A stabilization system as claimed in claim 15 wherein each of the restraint means comprises a plurality of restraint zones disposed so as to be spaced along the elongate structure.

19. A stabilization system as claimed in claim 18 wherein each restraint zone is defined by a restraint column arranged to extend from the seabed or ground.

* * * * *